United States Patent
Hsueh et al.

(10) Patent No.: US 10,916,786 B2
(45) Date of Patent: Feb. 9, 2021

(54) CHANNEL PLATE STRUCTURE AND ELECTROCHEMICAL APPARATUS WITH THE SAME

(71) Applicant: Industrial Technology Research Institute, Hsinchu (TW)

(72) Inventors: Kan-Lin Hsueh, Hsinchu (TW); Ching-Chen Wu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 291 days.

(21) Appl. No.: 16/215,568

(22) Filed: Dec. 10, 2018

(65) Prior Publication Data
US 2019/0207234 A1    Jul. 4, 2019

Related U.S. Application Data

(60) Provisional application No. 62/610,517, filed on Dec. 27, 2017.

(30) Foreign Application Priority Data

Dec. 6, 2018  (TW) .............................. 107143947 A

(51) Int. Cl.
*H01M 8/2483*  (2016.01)
*H01M 8/18*    (2006.01)
(Continued)

(52) U.S. Cl.
CPC ........... *H01M 8/04276* (2013.01); *C25B 1/34* (2013.01); *C25B 9/06* (2013.01); *C25D 5/00* (2013.01);
(Continued)

(58) Field of Classification Search
CPC ........... H01M 8/04276; H01M 8/0258; H01M 8/0265; H01M 8/18; H01M 8/04186;
(Continued)

(56) References Cited

U.S. PATENT DOCUMENTS

| 4,197,169 A | 4/1980 | Zahn et al. |
| 4,371,433 A | 2/1983 | Balko et al. |

(Continued)

FOREIGN PATENT DOCUMENTS

| TW | 200803023 | 1/2008 |
| TW | 200803024 | 1/2008 |

(Continued)

OTHER PUBLICATIONS

C-H. Chang et al., "Development of Integrally Molded Bipolar Plates for All-Vanadium Redox Flow Batteries," Energies, vol. 9, No. 350, May 2016, pp. 1-10 (Year: 2016).*

(Continued)

*Primary Examiner* — Alexander Usyatinsky
(74) *Attorney, Agent, or Firm* — JCIPRNET

(57) ABSTRACT

A channel plate structure includes a nonreactive portion and an electrochemical reactive portion. The nonreactive portion includes at least one manifold inlet, at least one manifold outlet, flow channels, and cutoff structures. The cutoff structures are respectively disposed in the flow channels, and the ratio of the total area of the cutoff structures to the area of the channel plate structure is 0.002 to 0.01 based on battery size. Each of the cutoff structures includes a gas-liquid separation compartment, a joint portion, and a convergent portion, wherein a width of the joint portion is smaller than or equal to that of the gas-liquid separation compartment, the convergent portion connects the gas-liquid separation compartment to the joint portion, and the cross-sectional area of a flow path at an downstream end of the convergent portion is smaller than that of the flow path at an upstream end of the same.

12 Claims, 14 Drawing Sheets

(51) Int. Cl.
*H01M 8/04276* (2016.01)
*H01M 8/04186* (2016.01)
*C25B 1/34* (2006.01)
*C25D 5/00* (2006.01)
*H01M 8/0258* (2016.01)
*C25B 9/06* (2006.01)
*H01M 8/0265* (2016.01)

(52) U.S. Cl.
CPC ....... *H01M 8/0258* (2013.01); *H01M 8/0265* (2013.01); *H01M 8/04186* (2013.01); *H01M 8/18* (2013.01); *H01M 8/2483* (2016.02)

(58) Field of Classification Search
CPC .......... H01M 8/2483; C25B 1/34; C25B 9/06; C25D 5/00
See application file for complete search history.

(56) References Cited

U.S. PATENT DOCUMENTS

| | | | |
|---|---|---|---|
| 6,475,661 B1 | 11/2002 | Pellegri et al. | |
| 7,727,656 B2* | 6/2010 | Yu | H01M 8/0221 |
| | | | 429/517 |
| 2002/0100681 A1* | 8/2002 | Kirk | C25B 9/20 |
| | | | 204/263 |
| 2005/0058862 A1* | 3/2005 | Sone | H01M 8/04186 |
| | | | 429/410 |
| 2006/0147787 A1* | 7/2006 | Yamauchi | H01M 8/0254 |
| | | | 429/457 |
| 2007/0287054 A1* | 12/2007 | Ueda | H01M 8/0662 |
| | | | 429/410 |
| 2009/0110970 A1* | 4/2009 | Tejima | H01M 8/04388 |
| | | | 429/429 |
| 2010/0183939 A1* | 7/2010 | Sekine | H01M 8/2457 |
| | | | 429/457 |
| 2012/0145050 A1* | 6/2012 | Fisenko | F04F 5/54 |
| | | | 110/219 |
| 2013/0065152 A1* | 3/2013 | Kim | H01M 8/0273 |
| | | | 429/457 |
| 2013/0202979 A1* | 8/2013 | Katano | H01M 8/04164 |
| | | | 429/444 |
| 2014/0050999 A1* | 2/2014 | Tolmachev | H01M 8/06 |
| | | | 429/418 |
| 2015/0318568 A1* | 11/2015 | Tolmachev | H01M 8/186 |
| | | | 429/422 |
| 2016/0209094 A1* | 7/2016 | Yokoyama | F25B 41/067 |
| 2017/0047605 A1 | 2/2017 | Chang et al. | |

FOREIGN PATENT DOCUMENTS

| | | |
|---|---|---|
| TW | 200807795 | 2/2008 |
| TW | M542258 | 5/2017 |

OTHER PUBLICATIONS

Wong et al., "The naturally oscillating flow emerging from a fluidic precessing jet nozzle," J. Fluid Mech., vol. 606, Jul. 10, 2008, pp. 153-188 (Year: 2008).*
C-H. Chang et al., "Development of Integrally Molded Bipolar Plates for All-Vanadium Redox Flow Batteries," Energies, vol. 9, No. 350, May 2016, pp. 1-10.
C.Y. Wong et al., "The naturally oscillating flow emerging from a fluidic precessing jet nozzle," J. Fluid Mech., vol. 606, Jul. 10, 2008, pp. 153-188.
Xiao Chen et al., "New Understanding of Mode Switching in the Fluidic Precessing Jet Flow," Journal of Fluids Engineering, vol. 139, Jul. 2017, pp. 071102-1-071102-10.

\* cited by examiner

CHANNEL PLATE STRUCTURE AND ELECTROCHEMICAL APPARATUS WITH THE SAME

CROSS-REFERENCE TO RELATED APPLICATION

This application claims the priority benefit of U.S. provisional application Ser. No. 62/610,517, filed on Dec. 27, 2017, and Taiwan application serial no. 107143947, filed on Dec. 6, 2018. The entirety of each of the above-mentioned patent applications is hereby incorporated by reference herein and made a part of this specification.

TECHNICAL FIELD

The disclosure relates to a channel plate structure and an electrochemical apparatus with the same.

BACKGROUND

The flow battery assembly is formed by connecting a plurality of single cells in series. Since the electrolytes between the individual cells are connected to each other, it is easy to lose electric energy under the interaction of the batteries. Therefore, the energy storage efficiency of such battery can be theoretically enhanced to close to 90% if the above problem can be resolved.

The above problem occurs in the existing electrochemical reaction tank because the individual cells are usually stacked in series to form a battery assembly or an electrolytic cell group for reducing the volume and cost of the tank. However, when an electrolyte with high ion conductivity is transported to each unit cell through the flow channels of the battery assembly or the electrolytic cell group, the voltages (or potential differences) are high at the ends of the battery cells or the electrolytic cells due to the electrical series connection of the electrodes. Some of the current conducts in the flow channels filled with highly conductive electrolyte, causing so-called leakage phenomenon. Such leakage phenomenon may cause electrical efficiency loss of the electrochemical reaction tank, and the internal current may cause corrosion of the components of the electrolytic cell or the battery assembly or cause decomposition and degradation of the electrolyte.

SUMMARY

The disclosure provides a channel plate structure that includes a nonreactive portion and an electrochemical reactive portion. The nonreactive portion includes at least one manifold inlet, at least one manifold outlet and a plurality of flow channels. The electrochemical reactive portion is disposed in a center of the channel plate structure. The electrochemical reactive portion is in communication with the at least one manifold inlet through one of the plurality of flow channels, and in communication with the at least one manifold outlet through another one of the plurality of flow channels. The nonreactive portion further includes a plurality of cutoff structures respectively disposed in the plurality of flow channels, and a ratio of a total area of the plurality of cutoff structures to an area of the channel plate structure is 0.002 to 0.01. Each of the cutoff structures includes a gas-liquid separation compartment, a joint portion and a convergent portion. The joint portion has a width less than or equal to a width of the gas-liquid separation compartment. The convergent portion connects the gas-liquid separation compartment to the joint portion, and a cross-sectional area of a flow path at a downstream end of the convergent portion is smaller than a cross-sectional area of the flow path at an upstream end of the same.

The disclosure further provides an electrochemical apparatus with the above channel plate structure.

Various exemplary embodiments accompanied with figures are described in detail below to further describe the disclosure in details.

DETAILED DESCRIPTION OF DISCLOSED JING

Figure 1:
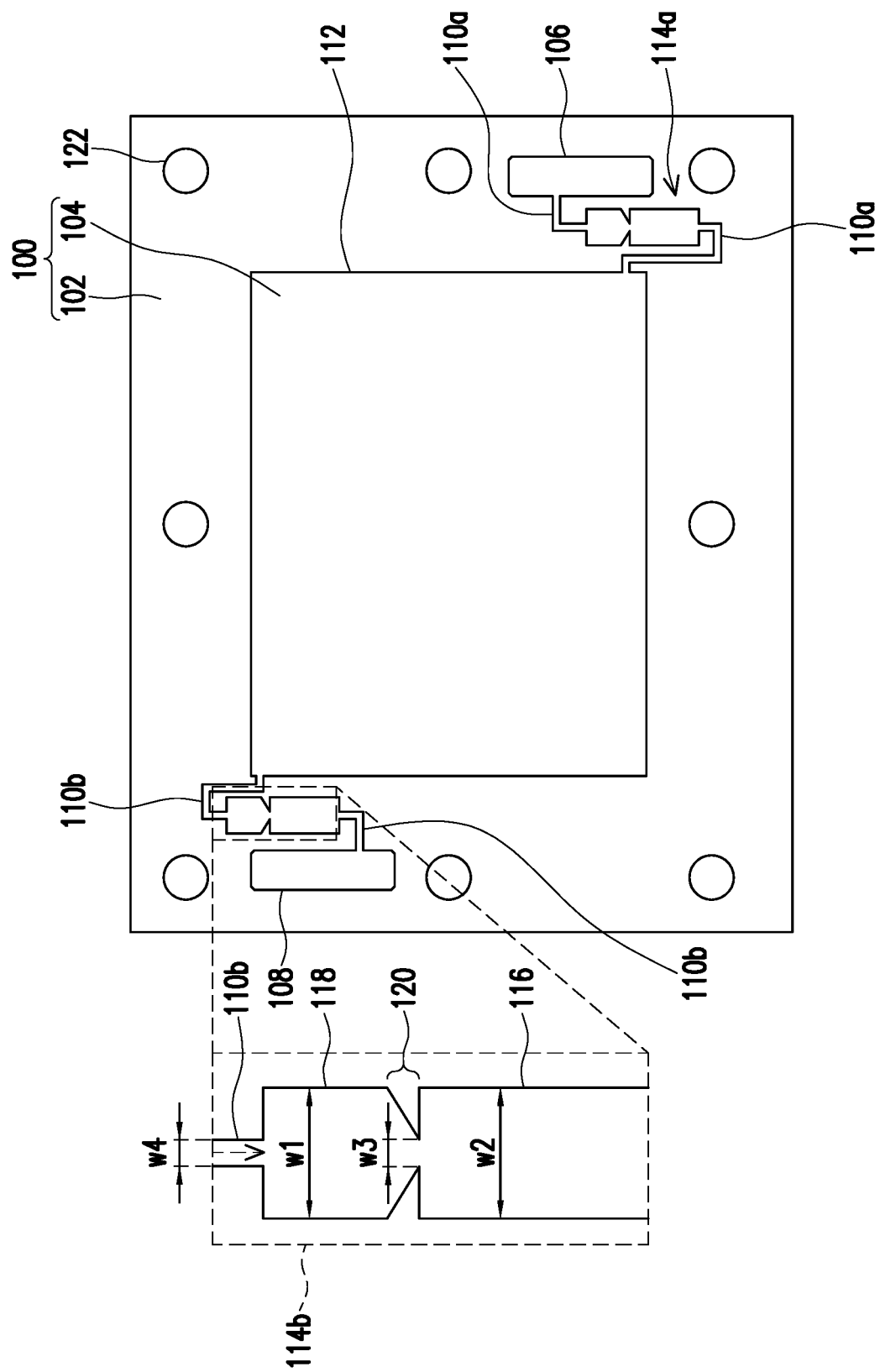
FIG. 1 is a schematic top view of a channel plate structure including cutoff structures in accordance with a first embodiment of the present disclosure.

The disclosure is further described in the following embodiments and the accompanying drawings, but the disclosure may be practiced in many different forms and should not be construed as being limited to the embodiments described herein. For the sake of easy understanding, the same elements in the following description will be denoted by the same reference numerals. In the drawings, for the sake of clarity, the components and their relative sizes may not be drawn to the actual scale.

FIG. 1 is a schematic top view of a channel plate structure in accordance with a first embodiment of the present disclosure.

Referring to FIG. 1, the channel plate structure 100 of the first embodiment includes a nonreactive portion 102 and an electrochemical reactive portion 104. The nonreactive portion 102 has a manifold inlet 106, a manifold outlet 108, and a plurality of flow channels 110a and 110b. The electrochemical reactive portion 104 is disposed in the center 112 of the channel plate structure 100, and the electrochemical reactive portion 104 is in communication with the manifold inlet 106 through one flow channel 110a, and in communication with the manifold outlet 108 through another flow channel 110b. Accordingly, the electrolyte can flow from the manifold inlet 106 and enter the electrochemical reactive portion 104 via the flow channel 110a, and the reacted electrolyte can flow out of the manifold outlet 108 via the flow channel 110b. The nonreactive portion 102 further includes cutoff structures 114a and 114b, the cutoff structure 114a is disposed in the flow channel 110a, the cutoff structure 114b is disposed in the flow channel 110b, and the ratio of the total area of the cutoff structures 114a and 114b to the area of the channel plate structure 100 is about 0.002 to 0.01. For example, if the channel plate structure 100 has a length between 10 cm and 200 cm and a width between 10 cm and 200 cm, each cutoff structure 114a or 114b has a length between about 5 cm and 10 cm and a width (e.g., the width w2 of the gas-liquid separation compartment 116) between about 2 cm and 5 cm. However, the present disclosure is not limited thereto, and the length and/or width can be changed according to the actual requirements.

In order to clearly show the detailed configuration of each cutoff structure, the enlarged view of the cutoff structure 114b is illustrated on the left side of FIG. 1. The illustrated cutoff structure 114b includes a gas-liquid separation compartment 116, a joint portion 118 and a convergent portion 120, so the bubbles are maintained in the gas-liquid separation compartment 116 to achieve the effect of cutting off the flow. Specifically, if the channel plate structure 100 of the first embodiment is applied to an electrochemical apparatus, an appropriate amount of gas (such as air) may be injected into electrochemical apparatus with a device such as a pump before the operation of the electrochemical apparatus, to make the ratio of air to liquid in the cutoff structure 114b is at least 1:5. The larger the air volume, the better the effect of cutting off the flow. The electrolyte in the channels 110a and 110b is then cut off by the cutoff structures 114a and 114b, so the resistance values within the channels 110a and 110b are increased, and the current does not conduct in the channels 110a and 110b to cause leakage. Therefore, the number of the cutoff structures 114a and 114b is, for example, the same as the total number of the manifold inlet 106 and the manifold outlet 108. The width w1 of the joint portion 118 may be less than or equal to the width w2 of the gas-liquid separation compartment 116, and the width w1 of the joint portion 118 may be equal to or greater than the width w4 of the flow channel 110b. In the present embodiment, the convergent portion 120 connects the gas-liquid separation compartment 116 to the joint portion 118, and the cross-sectional area of a flow path at the downstream end of the convergent portion 120 is smaller than the cross-sectional area of the flow path at the upstream end of the same; that is to say, if the cutoff structure 114b is taken as an example, the flow path refers to the path from the electrochemical reactive portion 104 to the manifold outlet 108 (as indicated by the dotted arrow in FIG. 1), the upstream end is the end connected to the joint portion 118, and the downstream end is the end connected to the gas-liquid separation compartment 116. Since the thickness of the nonreactive portion 102 of the channel plate structure 100 is limited, the thickness (or depth) of the cutoff structure 114b is generally equal to or smaller than the thickness of the nonreactive portion 102. Thus, as shown in FIG. 1, the convergent portion 120 has a shrinking structure that is reduced from the upstream end to the downstream end, for example. Accordingly, the cross-sectional area of a flow path at the downstream end is smaller than the cross-sectional area of the flow path at the upstream end. The minimum width w3 (e.g., between 0.3 cm and 2 cm) of the convergent portion 120 may be 0.1 to 0.4 times the width w1 of the joint portion 118, but the disclosure is not limited thereto. Additionally, depending on design requirements, connecting holes 122 for assembly may be provided at the edge of the nonreactive portion 102.

Figure 2:
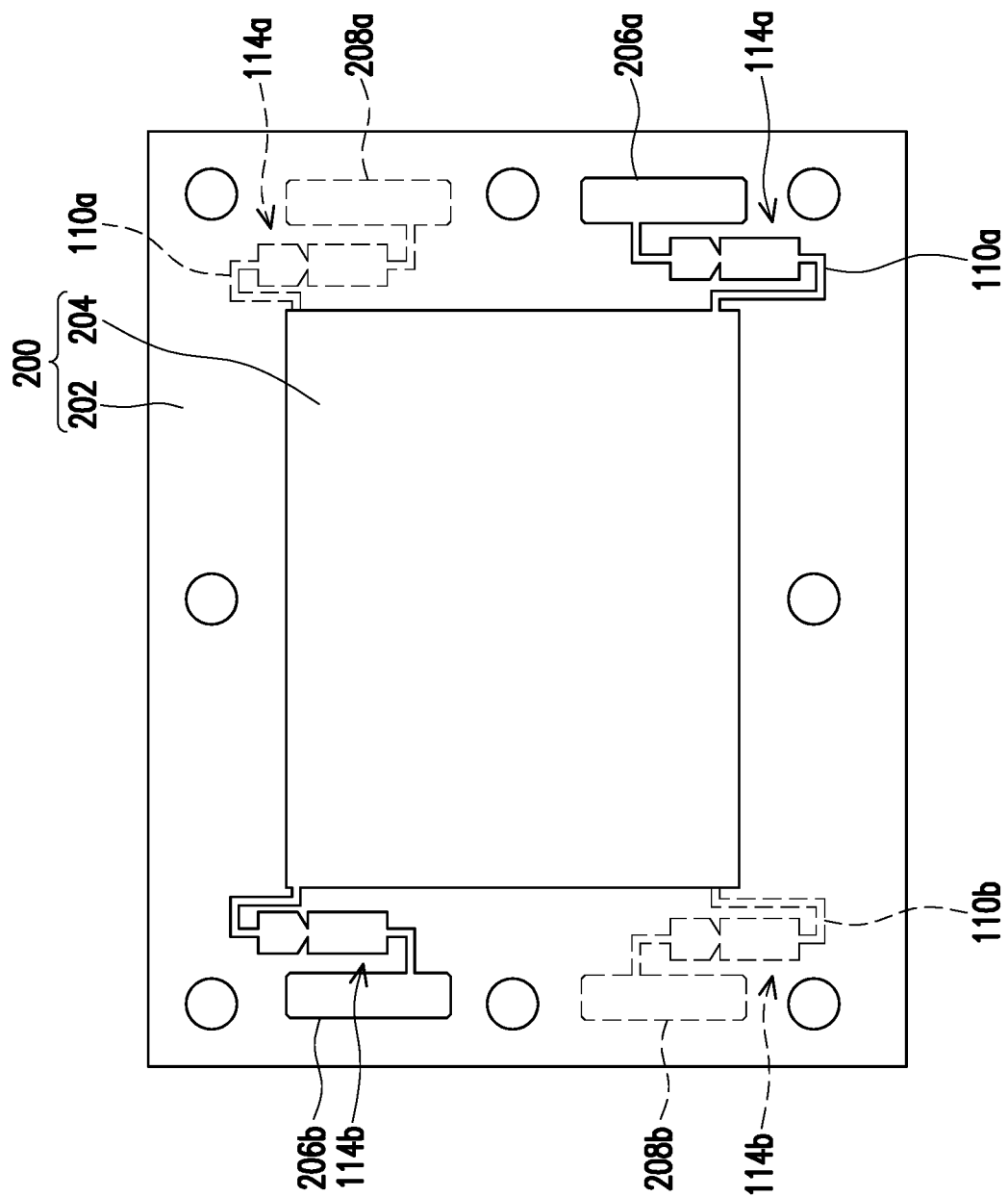
FIG. 2 is a schematic top view of a channel plate structure including cutoff structures in accordance with a second embodiment of the present disclosure.

FIG. 2 is a schematic top view of a channel plate structure in accordance with a second embodiment of the present disclosure, wherein the same reference numerals of the first embodiment denote the same and similar components of the present embodiment, the description of the same or similar components can also refer to the first embodiment, and details are not iterated herein.

In FIG. 2, when the channel plate structure 200 of the second embodiment is applied to a flow battery, a catholyte and an anolyte are required to introduce into the channel plate structure 200. Accordingly, a catholyte inlet 206a and a catholyte outlet 206b are disposed on the front side of the channel plate structure 200 at the nonreactive portion 202, and an anolyte inlet 208a and an anolyte outlet 208b (indicated by dotted lines) are disposed on the back side of the channel plate structure 200 at the nonreactive portion, so as to supply the catholyte and the anolyte into the electrochemical reactive portion 204, respectively. Therefore, there are total four cutoff structures 114a and 114b disposed in the front-side and back-side channels 110a and 110b of the nonreactive portion 202, respectively.

Figure 3:
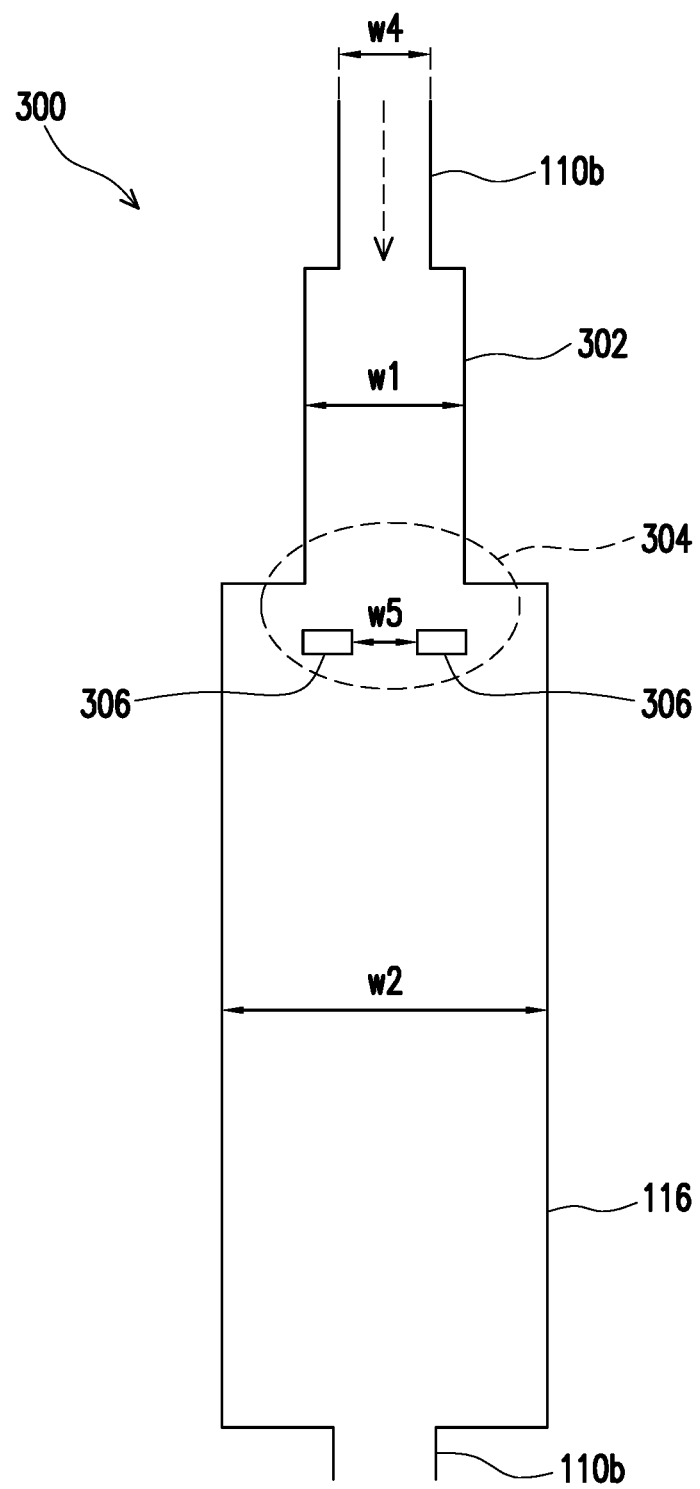
FIG. 3 is a schematic top view of a first cutoff structure in accordance with the present disclosure.
Figure 4:
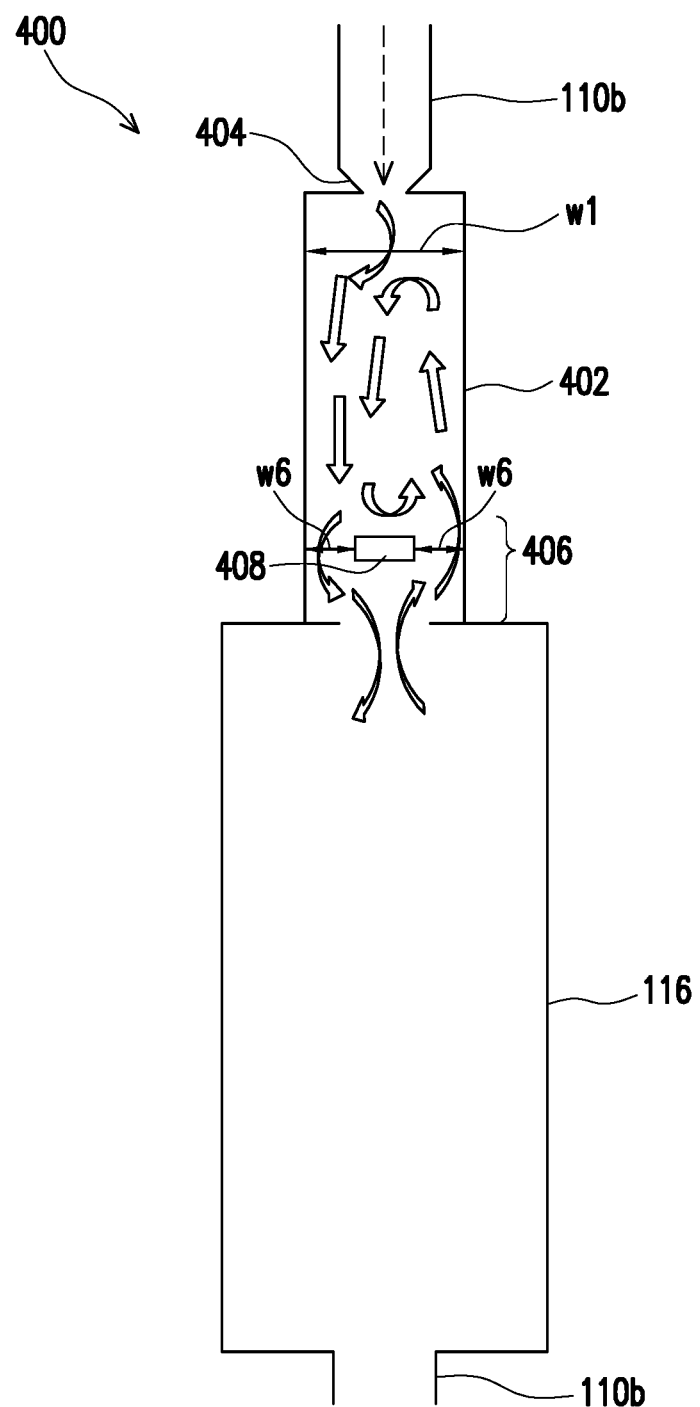
FIG. 4 is a schematic top view of a second cutoff structure in accordance with the present disclosure.

In addition to the cutoff structures of the first and second embodiments, other modified cutoff structures of the present disclosure are shown in FIG. 3 or FIG. 4.

FIG. 3 is a schematic top view of a first cutoff structure in accordance with the present disclosure, wherein the same reference numerals of the first embodiment denote the same and similar components of the present embodiment, the description of the same or similar components can also refer to the first embodiment, and details are not iterated herein.

In FIG. 3, the cutoff structure 300 includes a gas-liquid separation compartment 116, a joint portion 302 and a convergent portion 304, wherein the width w1 of the joint portion 302 is smaller than the width w2 of the gas-liquid separation compartment 116, and the width w1 of the joint portion 302 is greater than the width w4 of the flow channel 110b. In the present embodiment, the convergent portion 304 connects the gas-liquid separation compartment 116 to the joint portion 302, and the convergent portion 304 includes two baffles 306 disposed in the gas-liquid separation compartment 116 near the junction of the joint portion 302 and the gas-liquid separation compartment 116. The minimum width w5 of the flow path (i.e., the spacing between the baffles 306) of the convergent portion 304 is, for example, between 0.1 times and 0.4 times the width w1 of the joint portion 302, along with the width of the baffles 306 per se, such that the cross-sectional area of a flow path at the downstream end of the convergent portion 304 is smaller than the cross-sectional area of the flow path at the upstream end of the convergent portion 304. Two baffles 306 are provided in the cutoff structure 300 of the third embodiment, but the present disclosure is not limited thereto. The position, the number, the size, and the shape of the above baffles may be varied in all cases to achieve the effect of cutting off the flow.

FIG. 4 is a schematic top view of a second cutoff structure in accordance with the present disclosure, wherein the same reference numerals of the first embodiment denote the same and similar components of the present embodiment, the description of the same or similar components can also refer to the first embodiment, and details are not iterated herein.

In FIG. 4, the cutoff structure 400 includes a gas-liquid separation compartment 116, a joint portion 402 and a convergent portion 406, and further includes a shrinking structure 404 located between the joint portion 402 and the flow channel 110b and reduced from the upstream end to the downstream end. In the present embodiment, the convergent portion 406 includes a baffle 408 close to the joint portion 402, such that the cross-sectional area of a flow path at the downstream end is smaller than the cross-sectional area of the flow path at the upstream end, and the minimum width w6 of the flow path of the convergent portion 406 is, for example, 0.1 times and 0.4 times the width w1 of the joint portion 402. The arrows inside the cutoff structure 400 represent the possible flow directions of the liquid, so the electrolyte in the flow channel 110b is cut off and the air is maintained in the gas-liquid separation compartment 116.

The channel plate structure of the above embodiment may be disposed in an electrochemical apparatus, such as a flow battery, a metal air flow battery, an alkali halide industrial electrolytic cell, an electroplating industrial plating tank, or the like.

The following examples are provided to verify the effect of the present disclosure, but the present disclosure is not limited to the following.

Preparation Example

First, seven kinds of cutoff structures shown in FIG. 5A to FIG. 5G were produced, and in the following analytical experiments, a tube (for transporting the electrolyte) was connected to each of the upper and downstream ends of one cutoff structure, two nickel sheets serving as electrodes were separated by 100 mm and respectively placed in the tubes, and saline (NaCl) was used as an electrolyte (liquid). The cutoff structures of FIGS. 5A, 5B and 5C belonged to the type of the first embodiment; the cutoff structures of FIGS. 5D, 5E, 5F and 5G belonged to the type of FIG. 3, and the depth of the gas-liquid separation compartment and the joint portion in each of the cutoff structures was 1 mm to 2 mm.

<Resistance Measurement>

The impedance between the nickel electrodes was measured by an Electrochemical Impedance Spectroscopy (EIS) with an AutoLab. The electrolyte resistance was calculated by a Nyquist Plot. The EIS measurement was performed for 5 minutes every time after the flow rate was changed and maintained for 10 minutes.

Experimental Examples 1-2

Figure 5A:
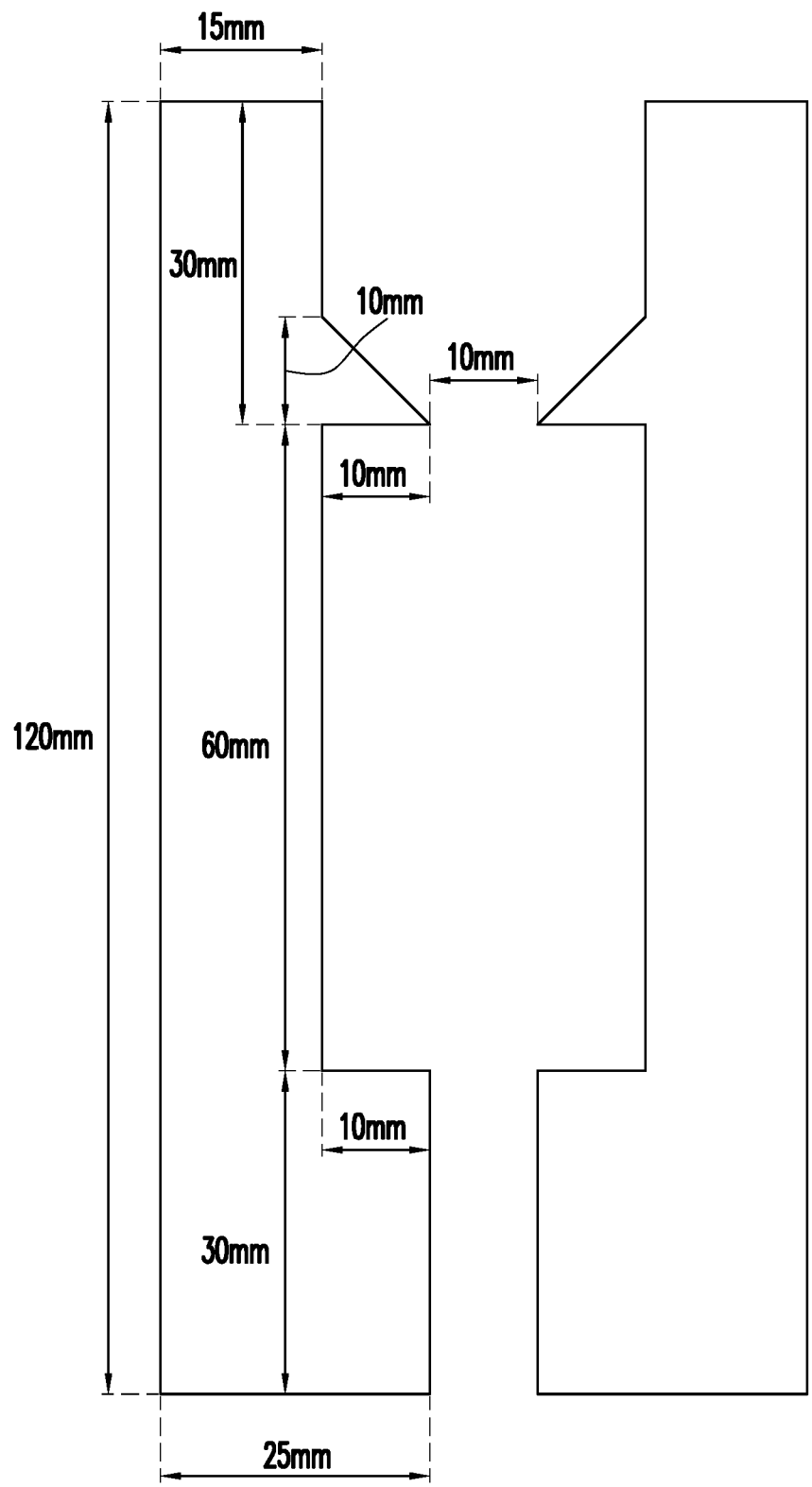
FIG. 5A to FIG. 5G are design drawings of various cutoff structures in Preparation Examples.
Figure 5B:
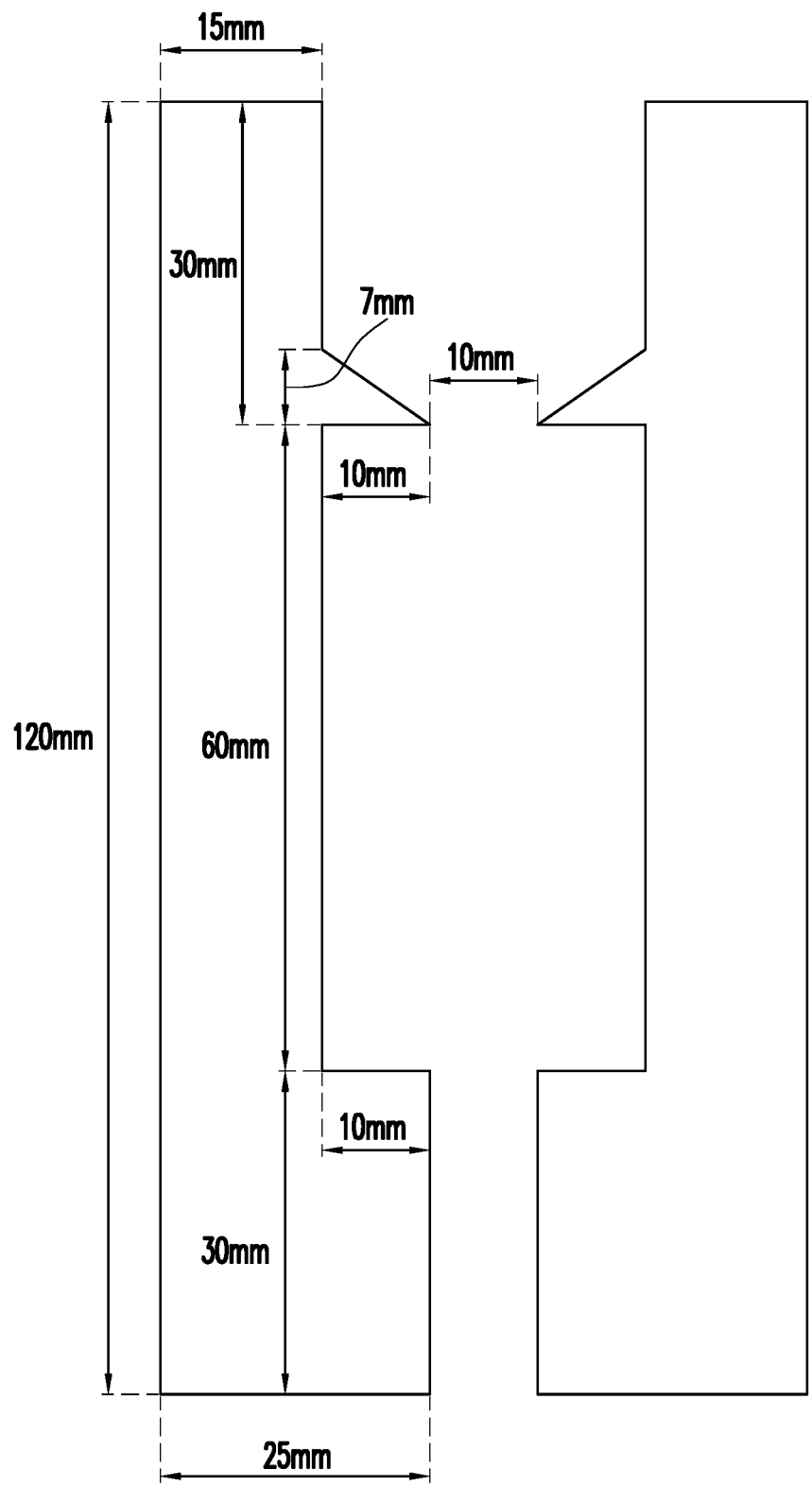
Figure 5C:
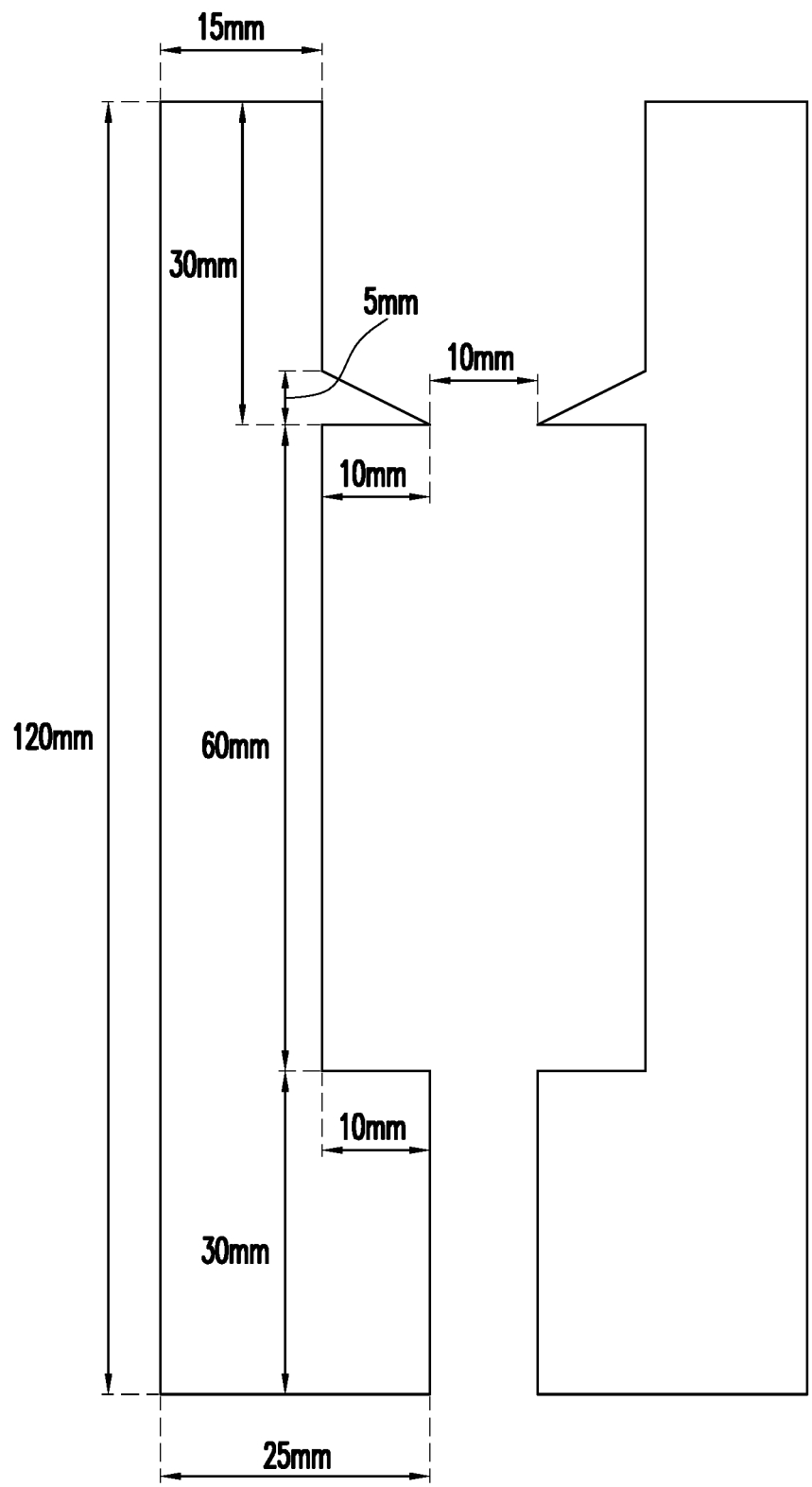
Figure 6A:
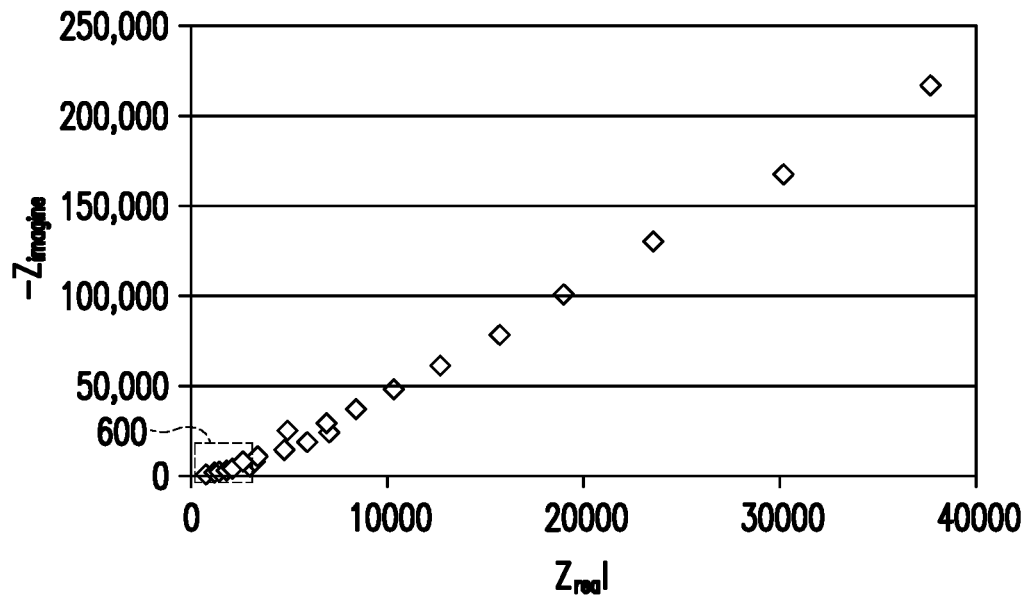
FIG. 6A is a Nyquist Plot of Experimental Example 1 measured under Condition 1.
Figure 6B:
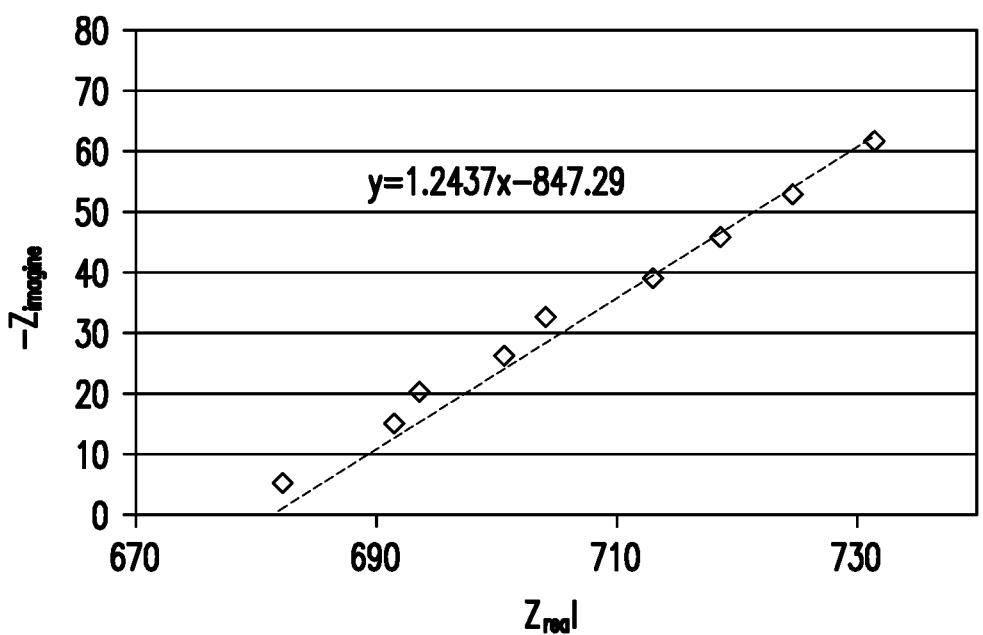
FIG. 6B is a partial enlarged view of the region 600 of FIG. 6A.

The cutoff structure of FIG. 5C was first used, and after all the tubes were connected, the electrolyte was circulated using a peristaltic pump. Then, the resistance measurement was performed according to Condition 1 of Table 1 below (the flow rate of the electrolyte was 5 ml min$^{-1}$ to 80 ml min$^{-1}$). The results are shown in FIGS. 6A to 6B. FIG. 6B is a partial enlarged view of the region 600 of FIG. 6A, and the value on the Y axis of FIG. 6B is the resistance value (in ohm) of the electrolyte.

Figure 7:
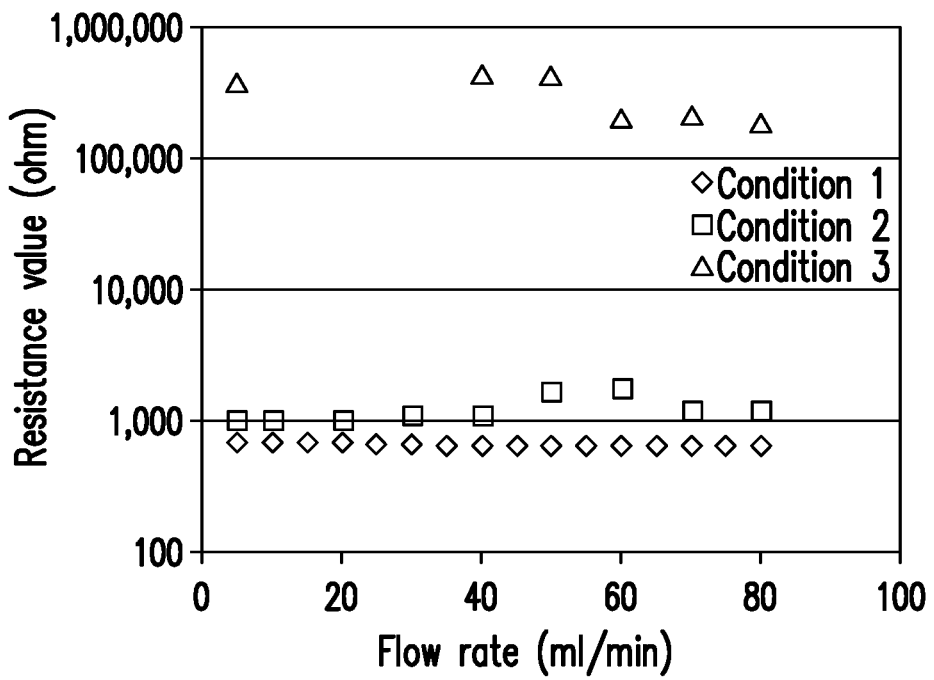
FIG. 7 is a graph showing the relationship between the resistance value and the flow rate of the cutoff structure of Experimental Example 1 as the flow rate varies.

Thereafter, the flow rate of the electrolyte was changed and the resistance was measured using the cutoff structure of FIG. 5C according to Conditions 1 to 3 of Table 1 below. The flow rate of the electrolyte ranged from 5 ml min$^{-1}$ to 80 ml min$^{-1}$ (e.g., respectively 5 ml min$^{-1}$, 10 ml min$^{-1}$, 15 ml min$^{-1}$, 20 ml min$^{-1}$, 25 ml min$^{-1}$, 30 ml min$^{-1}$, 35 ml min$^{-1}$, 40 ml min$^{-1}$, 45 ml min$^{-1}$, 50 Ml min$^{-1}$, 55 ml min$^{-1}$, 60 ml min$^{-1}$, 65 ml min$^{-1}$, 70 ml min$^{-1}$, 75 ml min$^{-1}$, 80 ml min$^{-1}$). The results are shown in FIG. 7.

Figure 8:
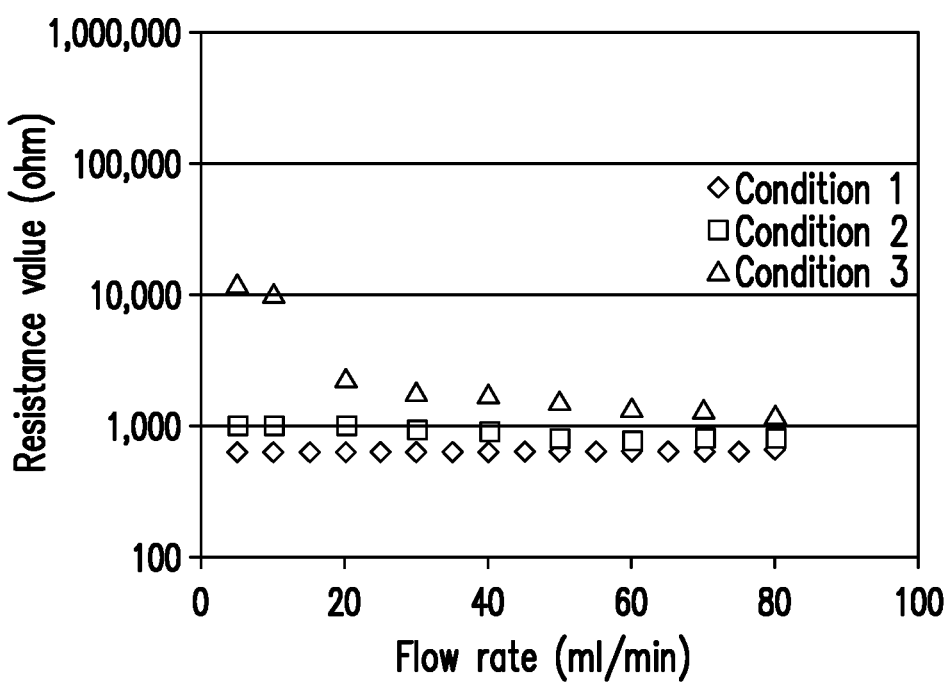
FIG. 8 is a graph showing the relationship between the resistance value and the flow rate of the cutoff structure of Experimental Example 2 as the flow rate varies.

In addition, the flow rate of the electrolyte was changed and the resistance was measured using the cutoff structure of FIG. 5B according to Conditions 1 to 3 of Table 1 below, and the flow rate of the electrolyte had the range as above. The results are shown in FIG. 8.

TABLE 1

| Experimental Example | Condition | Electrolyte | Flow pattern | Note |
|---|---|---|---|---|
| 1 | Condition 1 | Filled with electrolyte | Vertical | Width of shrinking structure: 10 mm |
|   | Condition 2 | Containing air | Lateral | Inclined angle of shrinking structure: 45° |
|   | Condition 3 | Containing air | Vertical |  |
| 2 | Condition 1 | Filled with electrolyte | Vertical | Width of shrinking structure: 10 mm |
|   | Condition 2 | Containing air | Lateral | Inclined angle of shrinking structure: 35° |
|   | Condition 3 | Containing air | Vertical |  |

If the electrolyte in Table 1 contains air, the amount of air is injected into the cutoff structure with a pump before the measurement, and the ratio of air to liquid is controlled at 1:3 to 1:5; if there is no air inside the cutoff structure, it means that cutoff structure is filled with electrolyte. The flow pattern "vertical" in Table 1 indicates that the flow path of the cutoff structure is perpendicular to the horizontal plane during the measurement, and the flow pattern "lateral" indicates that the flow path of the cutoff structure is parallel to the horizontal plane during the measurement.

As shown in FIG. 7 and FIG. 8, the change in the flow rate of the electrolyte does not affect the leakage prevention effect of the cutoff structure, because the inside of the cutoff structure is always maintained in a high resistance state. The case of Condition 3 achieves a better effect.

Experimental Examples 3-10

The same resistance measurement as in Experimental Example 1 was carried out according to the conditions of Table 2 below.

TABLE 2

| Experimental Example | Condition | Cutoff structure | Electrolyte | Flow pattern | Note |
|---|---|---|---|---|---|
| 3 | Condition 1 | FIG. 5C | Filled with electrolyte | Vertical | Width of shrinking structure: 10 mm |
|   | Condition 2 | FIG. 5C | Containing air | Lateral |  |
|   | Condition 3 | FIG. 5C | Containing air | Vertical | Inclined angle of shrinking structure: 27° |
| 4 | Condition 1 | Similar to FIG. 5B | Filled with electrolyte | Vertical | Width of shrinking structure: 4 mm |
|   | Condition 2 | Similar to FIG. 5B | Containing air | Lateral | Inclined angle of shrinking structure: 35° |
|   | Condition 3 | Similar to FIG. 5B | Containing air | Vertical |  |

TABLE 2-continued

Figure 5D:
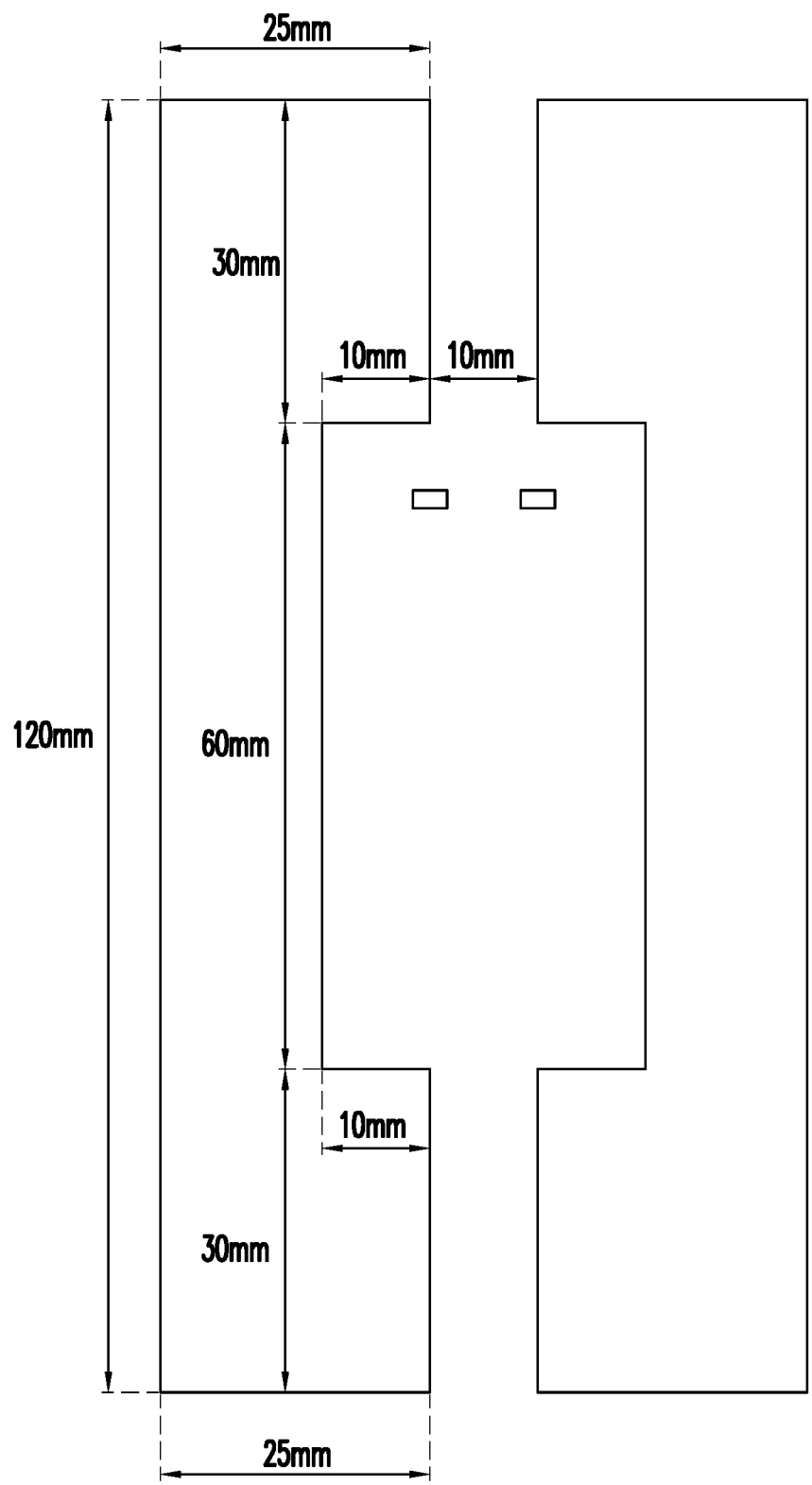
Figure 5E:
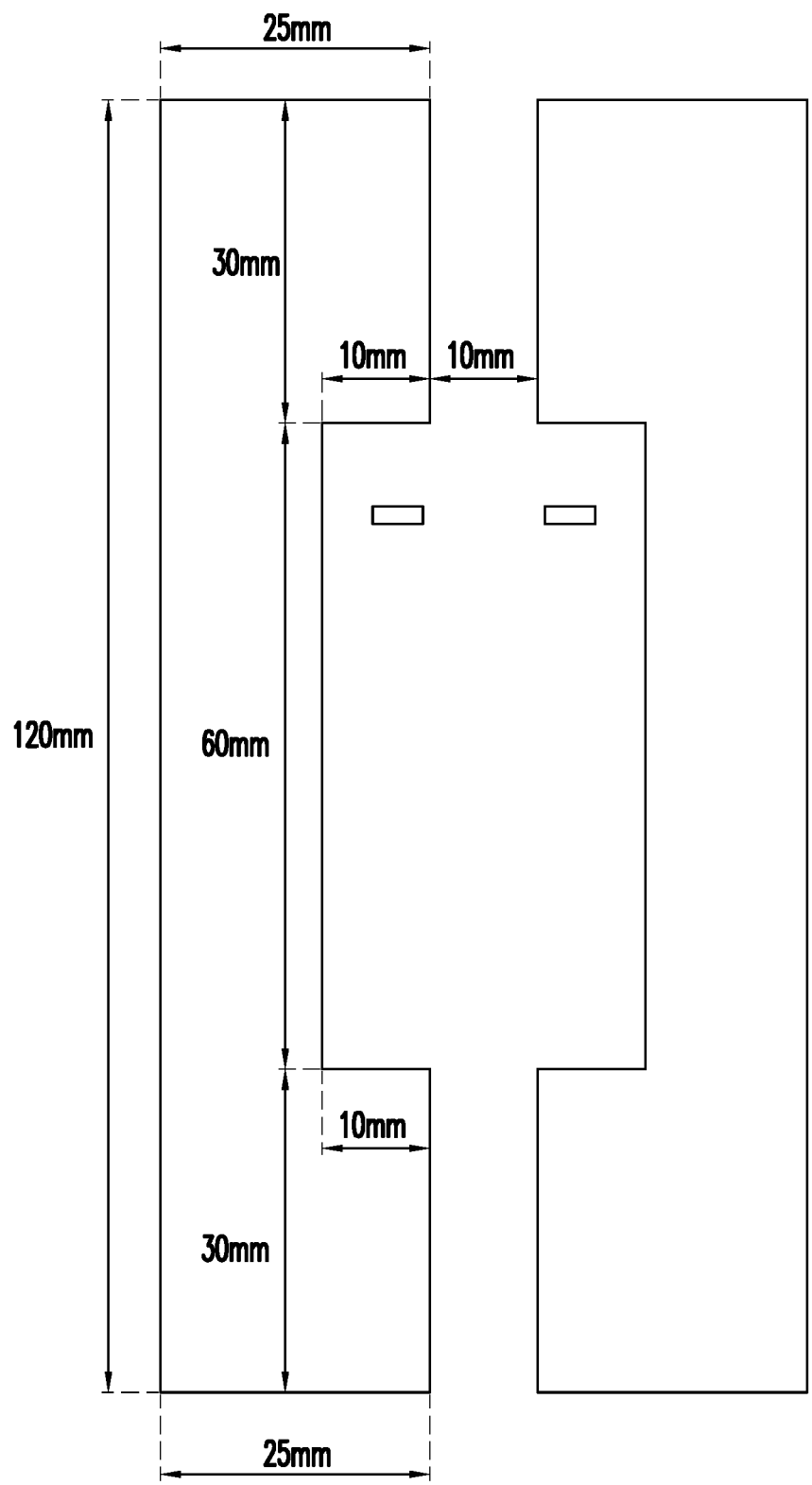
Figure 5F:
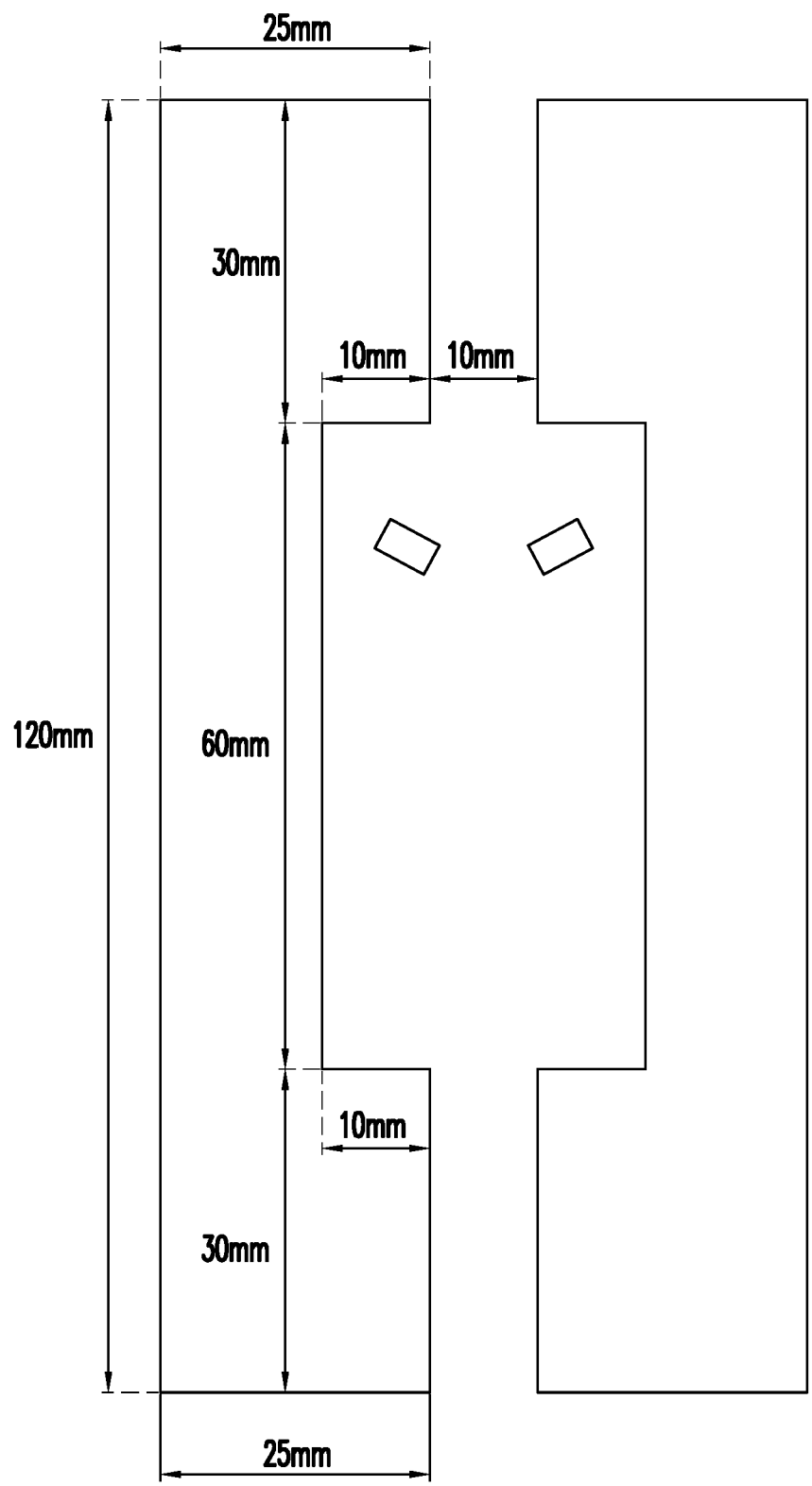
Figure 5G:
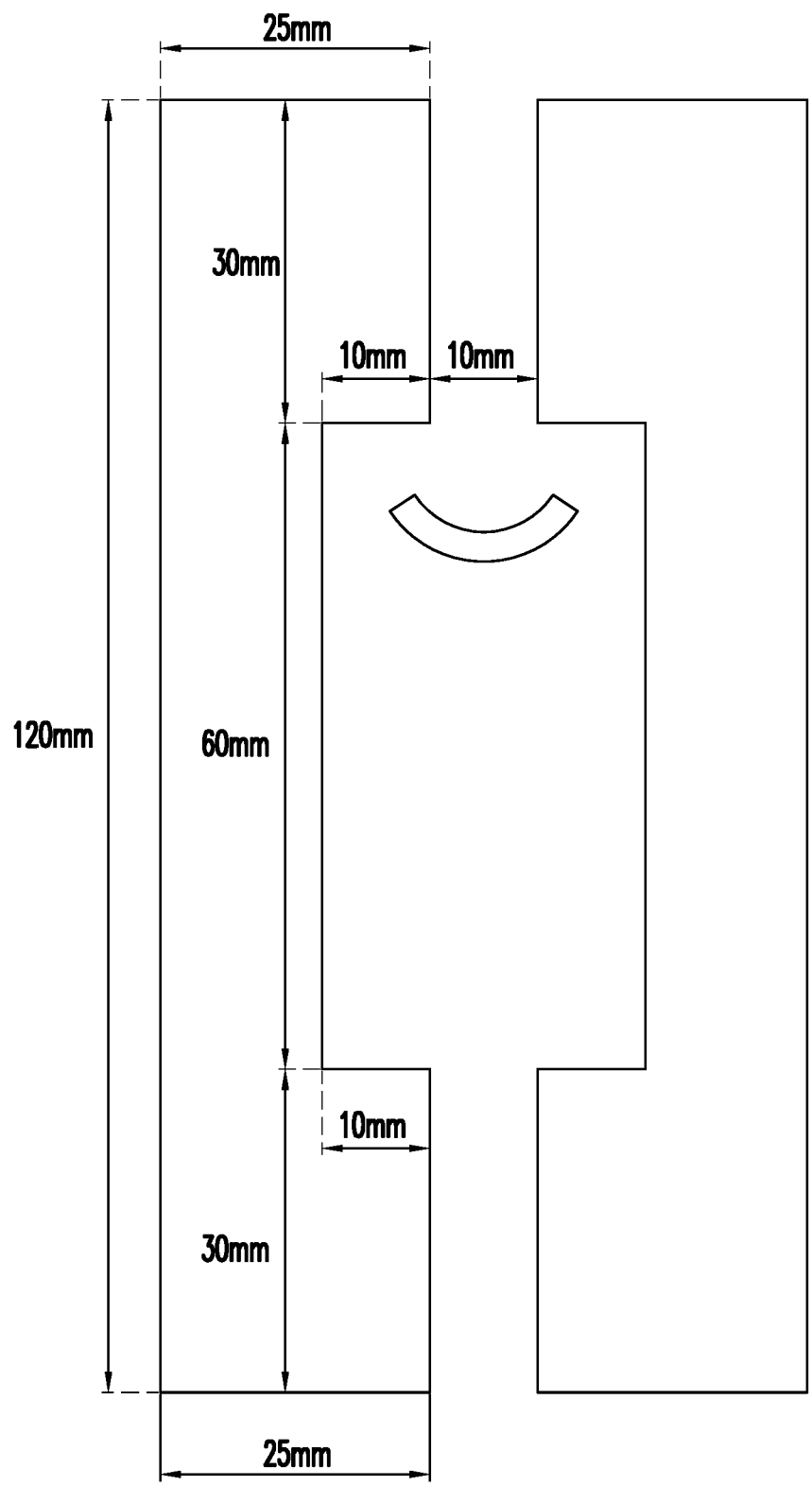

| Experimental Example | Condition | Cutoff structure | Electrolyte | Flow pattern | Note |
|---|---|---|---|---|---|
| 5 | Condition 1 | Similar to FIG. 5A | Filled with electrolyte | Vertical | Width of shrinking structure: 3 mm |
|  | Condition 2 | Similar to FIG. 5A | Containing air | Lateral | Inclined angle of shrinking structure: 45° |
|  | Condition 3 | Similar to FIG. 5A | Containing air | Vertical |  |
| 6 | Condition 1 | FIG. 5B | Containing air | Vertical | Width of shrinking structure: 10 mm |
|  | Condition 2 | FIG. 5B | Containing air | Lateral |  |
|  | Condition 3 | FIG. 5B | Containing air | Vertical | Inclined angle of shrinking structure: 35° |
| 7 | Condition 1 | FIG. 5E | Containing air | Vertical | Baffles replace shrinking structure |
|  | Condition 2 | FIG. 5E | Containing air | Lateral |  |
|  | Condition 3 | FIG. 5E | Containing air | Vertical | Baffle below shrinking structure by: 10 mm |
| 8 | Condition 1 | FIG. 5F | Containing air | Vertical | Baffles replace shrinking structure |
|  | Condition 2 | FIG. 5F | Containing air | Lateral |  |
|  | Condition 3 | FIG. 5F | Containing air | Vertical | Baffle below shrinkage structure by: 10 mm, inclined 45° |
| 9 | Condition 1 | FIG. 5D | Containing air | Vertical | Baffles replace shrinking structure |
|  | Condition 2 | FIG. 5D | Containing air | Lateral |  |
|  | Condition 3 | FIG. 5D | Containing air | Vertical | Baffles below shrinkage structure by: 8 mm, Opening width between baffles: 1 mm |
| 10 | Condition 1 | FIG. 5G | Containing air | Vertical | Baffles replace shrinking structure |
|  | Condition 2 | FIG. 5G | Containing air | Lateral |  |
|  | Condition 3 | FIG. 5G | Containing air | Vertical | baffles below shrinkage structure by: 5 mm, arc baffles |

The conditions in Table 2 are defined in a manner similar to that in Table 1, and are not iterated herein. The experimental results of Experimental Examples 3 to 10 and the results of Experimental Examples 1 and 2 are shown in FIG. 9, and the resistance values of Experimental Examples 2 and 8 under Condition 3 are not shown because these resistance values are too high.

Figure 9:
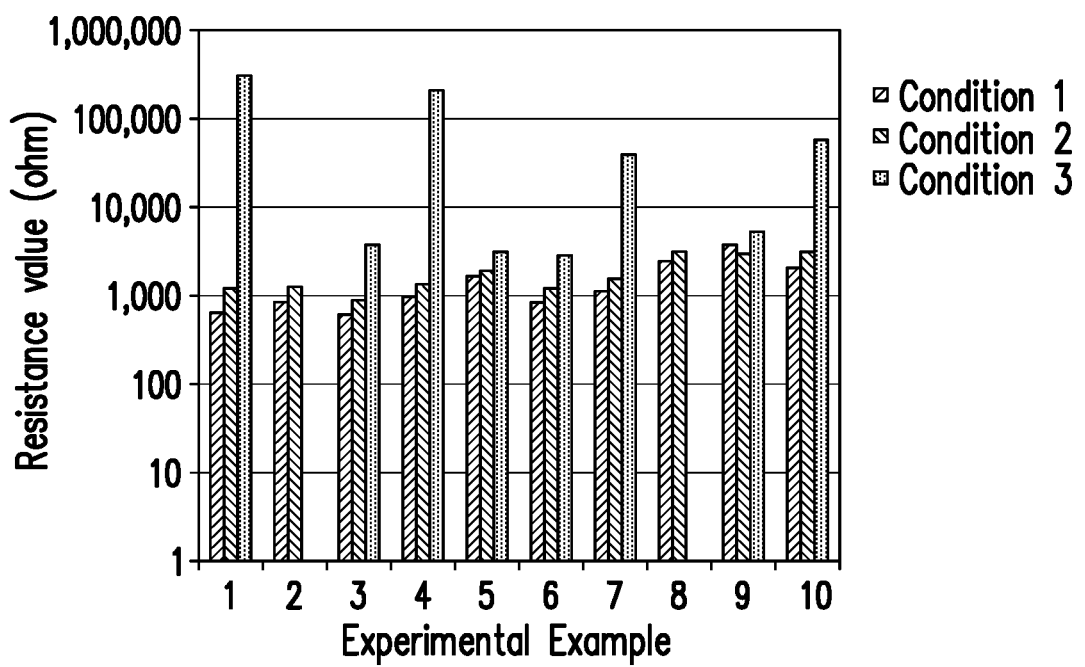
FIG. 9 is a bar graph of the resistance values of Experimental Examples 1-10.

The resistance values of various cutoff structures under different conditions are shown in FIG. 9. Under all the conditions, the resistance values are up to about 1000 ohm, and the resistance values under air-containing Conditions 2-3 are much higher. For example, the resistance value of Condition 3 is up to 1,000 times greater than the resistance value of Condition 1, and at least 3 times greater than the resistance value of Condition 1. Therefore, the cutoff structures of Experimental Examples 1 to 10 all achieve the leakage prevention effect.

In summary, the channel plate structure of the present disclosure is provided with a specially designed cutoff structure, thereby not only preventing the leakage from occurring through the electrolyte in channels, but also greatly reducing the area of the cutoff structures occupied in the channel plate structure. Accordingly, the power density of the electrochemical apparatus is enhanced.

It will be apparent to those skilled in the art that various modifications and variations may be made to the structure of the disclosed embodiments without departing from the scope or spirit of the disclosure. In view of the remaining, it is intended that the disclosure cover modifications and variations of this disclosure provided they fall within the scope of the following claims and their equivalents.

What is claimed is:

1. A channel plate structure, comprising:
    a nonreactive portion, comprising at least one manifold inlet, at least one manifold outlet and a plurality of flow channels; and
    an electrochemical reactive portion, disposed in a center of the channel plate structure, wherein the electrochemical reactive portion is in communication with the at least one manifold inlet through one of the plurality of flow channels, and in communication with the at least one manifold outlet through another one of the plurality of flow channels,
    wherein the nonreactive portion further comprises a plurality of cutoff structures respectively disposed in the plurality of flow channels, wherein a ratio of a total area of the plurality of cutoff structures to an area of the channel plate structure is 0.002 to 0.01, and
    wherein each of the cutoff structures comprises:
        a gas-liquid separation compartment;
        a joint portion, having a width less than or equal to a width of the gas-liquid separation compartment; and
        a convergent portion, connecting the gas-liquid separation compartment to the joint portion, wherein a cross-sectional area of a flow path at a downstream end of the convergent portion is smaller than a cross-sectional area of the flow path at an upstream end of the same.

2. The channel plate structure of claim 1, wherein the width of the joint portion is equal to or greater than a width of the flow channels.

3. The channel plate structure of claim 1, wherein a number of the cutoff structures is the same as a total number of the manifold inlet and the manifold outlet.

4. The channel plate structure of claim 1, wherein the at least one manifold outlet comprises a catholyte outlet and an anolyte outlet.

5. The channel plate structure of claim 1, wherein the at least one manifold inlet comprises a catholyte inlet and an anolyte inlet.

6. The channel plate structure of claim 1, wherein the convergent portion is a first shrinking structure that is reduced from the upstream end to the downstream end.

7. The channel plate structure of claim 1, wherein the convergent portion comprises at least one baffle close to the joint portion.

8. The channel plate structure of claim 1, wherein the convergent portion comprises at least one baffle close to the gas-liquid separation compartment.

9. The channel plate structure of claim 1, wherein a minimum width of the path of the convergent portion is 0.1 times to 0.4 times the width of the joint portion.

10. The channel plate structure of claim 6, further comprising a second shrinking structure disposed between the joint portion and the flow channel, wherein the second shrinking structure is reduced from the upstream end to the downstream end.

11. An electrochemical apparatus, comprising the channel plate structure of claim 1.

12. The electrochemical apparatus of claim 11, wherein the electrochemical apparatus comprises a liquid flow battery, an alkali halide industrial electrolytic cell or an electroplating industrial plating tank.

\* \* \* \* \*